May 1, 1934.  A. HALTMEIER  1,956,920
LIQUID LEVEL INDICATOR
Filed June 28, 1930
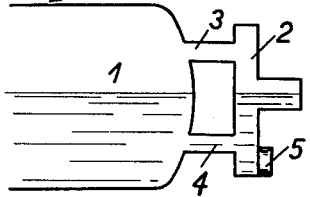
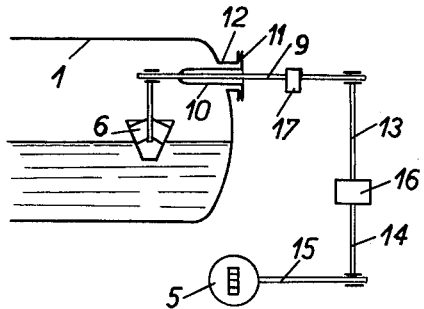
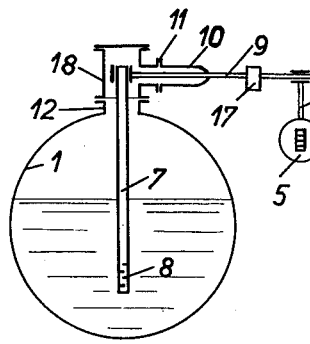
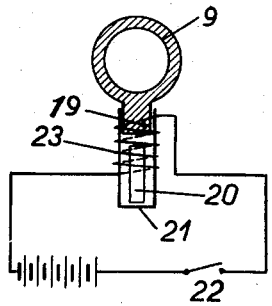
Inventor:
Alfred Haltmeier,
By Byrne, Townsend & Potter
Attorneys.

73. MEASURING AND TESTING.

Patented May 1, 1934

1,956,920

UNITED STATES PATENT OFFICE 1,956,920

LIQUID LEVEL INDICATOR

Alfred Haltmeier, Cologne-on-the-Rhine, Germany, assignor to I. G. Farbenindustrie Aktiengesellschaft, Frankfort-on-the-Main, Germany, a corporation of Germany Application June 28, 1930, Serial No. 464,648
In Germany June 28, 1929

6 Claims. (Cl. 73—54)

The present invention relates to means for indicating, recording or regulating the level of liquids in containers, and consists in utilizing for this purpose oscillations in the containers or in auxiliary containers connected therewith, elastically.

The determination of the level of a liquid in a container has remained an unsolved or only imperfectly solved problem for many containers, for instance, those high pressure containers which are more and more used in chemical industry and also in steam technology. The simplest means enabling observation of the level of liquids in containers are observation glasses. But these have various faults, some of which result from the fact that due to the great variations in the level of the liquids which are to be observed it is only possible to employ a single glass at low pressures; generally several separate glasses must be fixed one above the other in order to be able to observe the variations of the level of the liquids throughout the entire range; by means of observation glasses it is possible to indicate the level of the liquids, but it is not possible to record it and to set in motion an appropriate regulating appliance. As to containers which contain chemically active liquids, there are often great difficulties in constructing the observation glasses as well as the armature thereof sufficiently resistant. Also in steam boilers which are under high pressure and the contents of the liquids of which possess more or less strong alkaline properties in consequence of the softening of the feed water, the observation glasses often suffer from chemical attack in such a manner that it is hardly possible to observe the level of the liquids. Further, changes of pressure and temperature cause frequent cracking of the glasses in high pressure boilers. A further fault of the glasses as well as of all means indicating the level of the water which are proposed to replace them lies in their unreliability. In spite of the presence of blow-off valves and blow-off cocks an obstruction in the joining conductors with resulting failure of operation cannot be prevented.

The means enabling observation of the level of liquids in containers which I have found have advantages over all means of this kind hitherto known and are especially superior to observation glasses. At all times they act in an absolutely reliable manner and any obstruction is excluded. Blow-off means, such as valves and cocks, are not employed. The use of my apparatus is neither limited by the high pressures nor by the high temperatures of the liquids in the container. By means of my apparatus small changes as well as large changes in the level of liquids may be very exactly observed and controlled without several means, such as in the case of observation glasses, being necessary.

The fundamental conception of my new device is the dependence of frequency of oscillation of the system on the mass.

A container filled with liquids and elastically supported forms a system capable of oscillating, the natural frequency of oscillation of which depends on the level of liquids. Therefore, the level of liquids in the container can be controlled by means of the variation of the natural frequency of oscillation. Any variation in the level of liquids produces a variation in the natural frequency of oscillation, which can serve as a measure for the level of the liquid in the elastically supported container.

Fig. I illustrates one form of the apparatus applied to a boiler.

Figs. II and III illustrate modification of the apparatus with the vibrating element placed within the boiler and, Fig. IV is a detailed view of the impulse mechanism.

A simple application of the process is shown by way of example in Figure 1. The container 2 is elastically connected with the boiler 1 by the elastic tubes 3 and 4. The container 2 may have any desired form and the liquids therein have the same level as the liquids in the boiler 1. An oscillation meter 5 is fastened to the container 2. When for any reason, for example, as the result of impulses or shocks created through the agency of simple striking mechanisms, actuated either by hand or automatically, the natural frequency of oscillation of the system capable of oscillation, which is formed by the container 2 and the elastic tubes 3 and 4 and the liquid contained therein, is excited, the natural frequency of oscillation of which depends on the level of liquids, said frequency is indicated by the oscillation meter 5, which, for instance, may be in the form of a tongue frequency meter.

The oscillation of the containers can be excited in various ways. In many cases the vibrations present in the surroundings will suffice. But in order to avoid all possibilities of misleading readings, it is found to be advantageous to employ special mechanisms for exciting the oscillations. The natural frequency of oscillation can be excited by impulses either by hand or by striking mechanisms which are actuated by electricity or compressed air or by means of a hammer. However, the container can also be set in forced oscillation, which can be produced by means of any oscillation exciter, which is either rotating or operates with a to and fro motion, for instance, by motors or oscillators. The amplitudes of forced oscillations of the container depend on the level of the liquid and therefore they can serve as a measure for the level of the liquid. The oscillations produced in this manner which, according to the level of the liquid in the container, are subjected to changes can be used for indicating, regulating and recording either directly or by means of mechanical or electrical transmitting elements. Because of the great thickness of the walls which the auxiliary container must have at high pressures its mass becomes proportionally large, so that alterations of the level of liquid only cause a slight change in the natural frequency. It is also true that the thicker the walls of the auxiliary container, the less accurate becomes the recording of the changes in the frequency of its oscillations. It has now been found that this fault can be overcome if the oscillating auxiliary container is placed in the interior of the main container and when so positioned the walls of the auxiliary container do not have to be of any especial thickness. As a further advantage it may be mentioned that the construction of the apparatus is simplified and it is easier to position the same in almost any part of a larger container. For high pressure containers also the diminished number of the required perforations of the walls of the container, a greater liberty in giving a form to the oscillation container are of importance.

In Figures II and III I have illustrated two other forms of the appliance. 1 always indicates the larger container, the level of the liquid in which is to be determined, 6 indicates the oscillating element or container which is provided in the upper and in the lower part with openings in order to extend the level of the liquid therein. In Figure II it is presumed that any alterations in the level of liquid are to be very accurately observed. The oscillating container is therefore provided with a proportionally large cross section. In order to diminish damping, it is advantageous to give the oscillating auxiliary container a conical shape decreasing in the downward direction whereby at the same time a more symmetrical change of the natural frequency with the level of liquid is attained. In Figure III the oscillating element or container 7 has the form of a tube. This modification is advantageous if large changes in the level of liquids are to be observed by only one appliance. In order to avoid or diminish the to and fro motion of the liquid in the oscillating container 7 which is caused by the formation of waves on the surface of the liquid in container 1 on the one hand, and to make sure that the liquid in container 7 takes part in the oscillations on the other hand, the lower open part of container 7, dipping into the liquid is provided with damping devices in the form of resistances 8 or perforated plates. In the case of a variation in the level of liquids the mass of the oscillation container and also the natural frequency of oscillations dependent thereon varies accordingly.

In order to conduct the oscillations through the walls of the larger container elastic tubes 9 are used. Advantageous appliances of these elastic conductors are shown in Figures II and III where wider tubes 10 are used surrounding the conducting tubes 9. These surrounding tubes are welded on the one end with the conducting tubes and at the other end they are fastened within flanges 11, said flanges being screwed on sockets 12 of the bigger container. In Figure III the socket is situated upon the container 1 and is fitted with a T-piece 18. The oscillations are transmitted to an oscillation meter 5 by elastic pipes or rods 9, 13, 14 and 15 or 9 and 13 respectively. The oscillation meter 5 is situated in an appropriate position. The oscillations can be used for starting, indicating, recording or regulating appliances, which appliances are positioned distant from the container, by a transmission device 16 shown in Figure II.

In Figures II and III the number 17 indicates an impulse mechanism which excites the natural oscillations of the system capable of oscillation the mass of which is variable according to the height of the liquid. An appropriate form of device is shown in Figure IV. In this figure a solenoid 23 with an anvil 19 is fastened to a pipe 9. In the solenoid is positioned an iron core 20 which lies on the bottom 21 when no current flows through the device. When the circuit is closed by the switch 22, which can be operated by hand or by mechanical means as, for instance, a motor, then the iron core is drawn into the solenoid whereby it pushes upon the anvil 19. By this shock the natural oscillations of the container 6 or 7 are excited, which oscillations are transmitted by the elastic pipes shown in Figures II and III to the oscillation meter 5.

I claim:

1. A device for determining the level of liquid in a vessel, which comprises an auxiliary element elastically sustained by the vessel and in contact with the liquid in the latter, said element being so positioned with respect to the vessel that the level of liquid in or about the element corresponds to that of the liquid in the vessel, oscillation-inciting means associated with the element, and means connected to the element for determining the alterations of the oscillation of the element which are in proportion to the liquid level.

2. A device for determining the level of liquid in a vessel, which comprises an auxiliary element elastically sustained by the vessel and in contact with the liquid in the latter, said element being so positioned with respect to the vessel that the level of liquid in or about the element corresponds to that of the liquid in the vessel, whereby its period of oscillation will be damped proportionally to the liquid level, means associated with the element for inciting natural oscillations of the element and its liquid, and means mediately connected to the element for determining the period of oscillation of the element and its liquid.

3. A device for determining the level of liquid in a vessel, which comprises an auxiliary container within the vessel and in communication with the liquid in the latter, said container being so positioned with respect to the vessel that the level of liquid in the former corresponds to that of the liquid in the latter, means associated with the container for inciting natural oscillations of the container and its liquid contents, means for transmitting said oscillations outside the vessel, and means connected to said container through said transmitting means for determining the period of oscillation of the container and its liquid contents.

4. A device for determining the level of liquid in a closed vessel, which comprises a substantially vertical open-ended chamber constituting an auxiliary container within the vessel and in communication with the liquid in the latter, said chamber being so positioned with respect to the vessel that the level of liquid in the former corresponds to that of the liquid in the latter, means associated with the chamber for inciting natural oscillations of the chamber and its liquid contents, an oscillation meter outside of said vessel, and means connecting said chamber and said meter elastically through the wall of said vessel for transmitting oscillations from said chamber and its liquid contents to said meter.

5. A device for determining the level of liquid in a closed vessel, which comprises a substantially vertical open-ended chamber constituting an auxiliary container within the vessel and in communication with the liquid in the latter, said chamber being so positioned with respect to the vessel that the level of liquid in the former corresponds to that of the liquid in the latter, means associated with the chamber for inciting natural oscillations of the chamber and its liquid contents, an oscillation meter outside said vessel, an oscillation-transmitting member connecting said chamber and said meter through a wall of the vessel, and an elastic connection between said transmitting member and said wall.

6. A device for determining the level of liquid in a closed vessel, which comprises a substantially vertical open-ended chamber constituting an auxiliary container within the vessel and in communication with the liquid in the latter, said chamber being so positioned with respect to the vessel that the level of liquid in the former corresponds to that of the liquid in the latter, an oscillation meter outside said vessel, an oscillation-transmitting member connecting said chamber and said meter through a wall of the vessel, an elastic connection between said transmitting member and said wall, and an electrically operated striking mechanism associated with said transmitting member for inciting natural oscillation of said chamber.

ALFRED HALTMEIER.